United States Patent [19]

Siri et al.

[11] 4,055,488
[45] Oct. 25, 1977

[54] WOOD CLEANING AND SEPARATING APPARATUS

[75] Inventors: Joseph J. Siri; John P. Knapp, both of Portland, Oreg.

[73] Assignee: Siri Systems, Inc., Portland, Oreg.

[21] Appl. No.: 690,849

[22] Filed: May 28, 1976

[51] Int. Cl.² ............................................. B03B 5/28
[52] U.S. Cl. ................................. 209/173; 198/722; 198/738
[58] Field of Search ............ 209/162, 163, 172, 172.5, 209/173; 198/506, 517, 722, 738, 518; 214/17 C, 17 DB, 17 DA

[56] References Cited

U.S. PATENT DOCUMENTS

| 2,486,682 | 11/1949 | Ridley | 209/172.5 |
| 2,603,352 | 7/1952 | Tromp | 209/172.5 |
| 2,713,945 | 7/1955 | Fontein | 209/172.5 |
| 3,294,491 | 12/1966 | Brown | 214/17 DB X |
| 3,944,086 | 3/1976 | Frisz et al. | 214/17 DA |

FOREIGN PATENT DOCUMENTS

| 15,783 of | 1895 | United Kingdom | 209/173 |

*Primary Examiner*—Frank W. Lutter
*Assistant Examiner*—Ralph J. Hill
*Attorney, Agent, or Firm*—Klarquist, Sparkman, Campbell, Lee, Hall & Whinston

[57] ABSTRACT

A carriage movable back and forth along a tank of water has an agitator which washes floatable material and moves it to a floating material conveyor at one end of the tank. Denser, sinkable material washed from the floatable material drops onto a sunk material conveyor coursing along the bottom of the tank. The drive of the carriage is reversible and, when excess resistance is met when the carriage is traveling toward the floating material conveyor, the resistance actuates a control to reverse the drive of the carriage.

13 Claims, 5 Drawing Figures

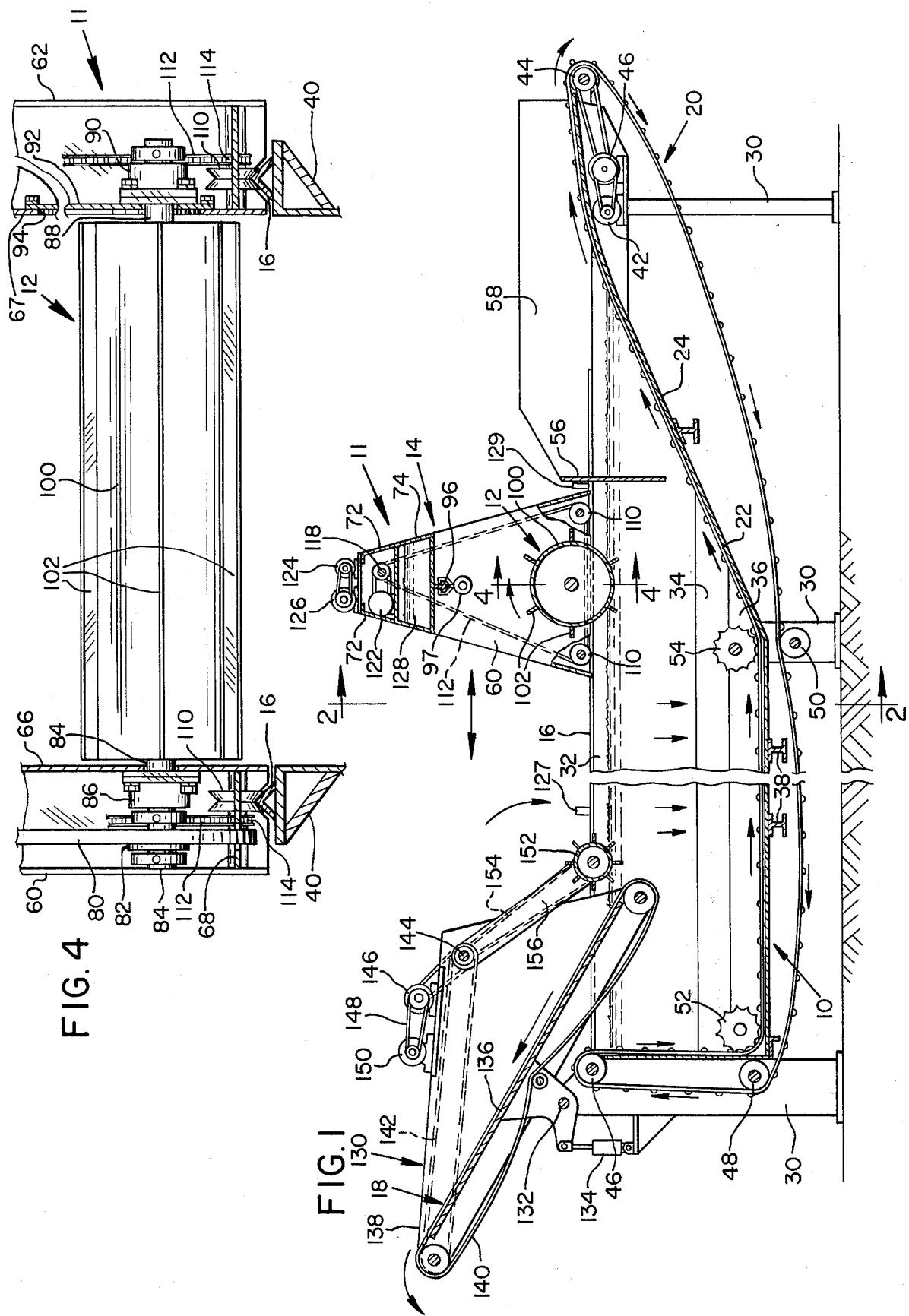

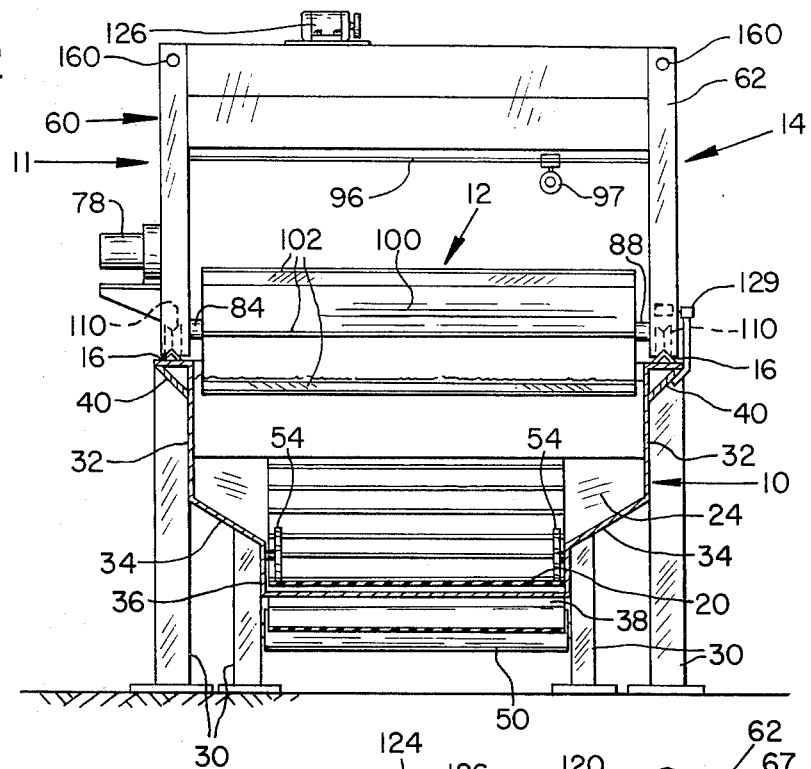
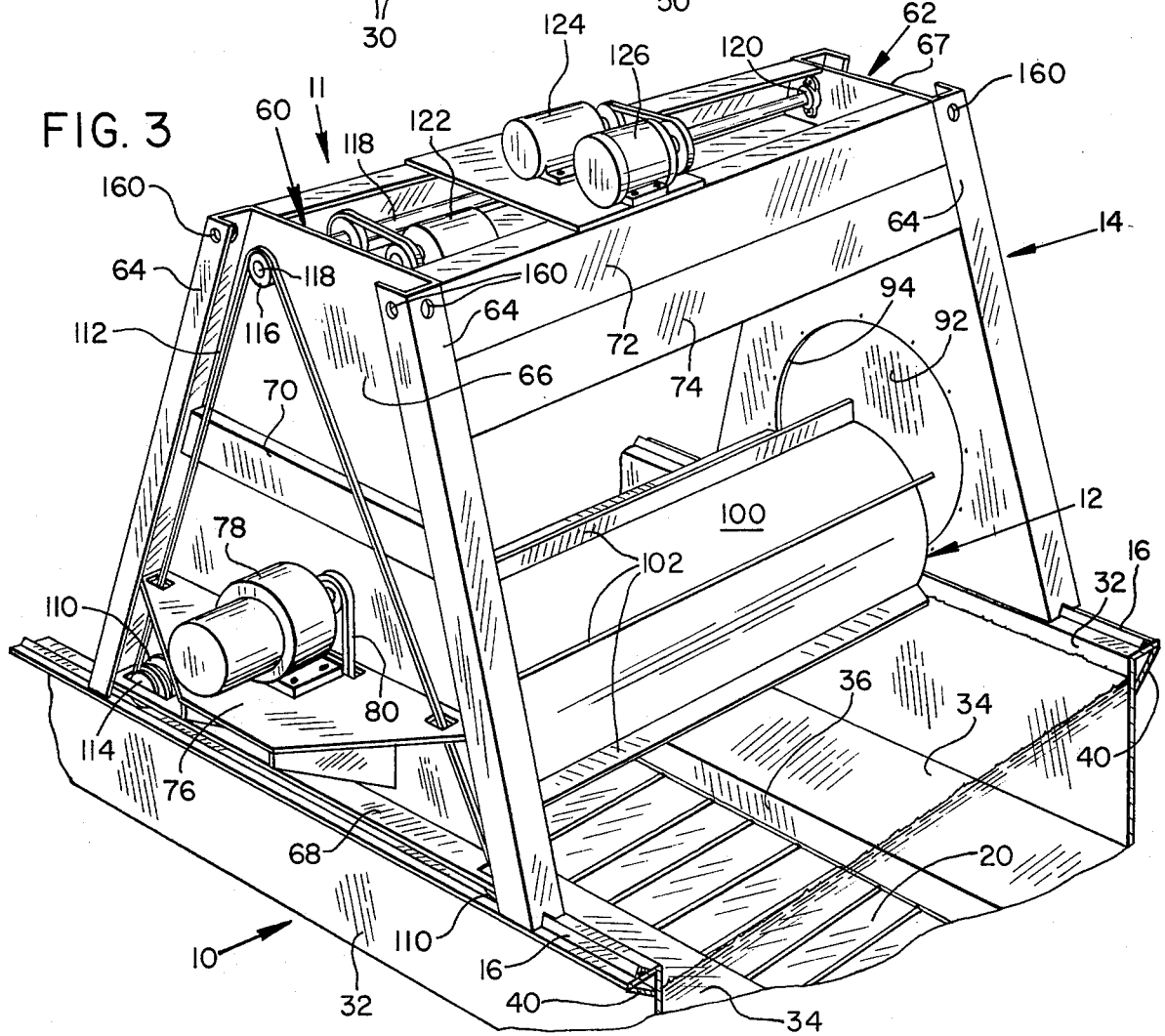

WOOD CLEANING AND SEPARATING APPARATUS

DESCRIPTION

This invention relates to a wood cleaning and separating apparatus, and has for an object thereof the provision of an improved wood cleaning and separating apparatus.

Another object of the invention is to provide a wood cleaning and separating device which has an agitator carriage movable along a tank with an agitator to clean sinkable material from wood pieces and wash the wood pieces toward an exit conveyor.

A further object of the invention is to provide an ambulatory agitator movable along a tank to push floating material to an exit end of the tank.

Another object of the invention is to provide a wood cleaning and separating apparatus including an agitator supported by a carriage movable along a water tank to push wood to an exit end washing sinkable material from the wood.

In the drawings:

FIG. 1 is a longitudinal, vertical sectional view of a wood cleaning and separating apparatus forming one embodiment of the invention;

FIG. 2 is a vertical sectional view taken along line 2—2 of FIG. 1;

FIG. 3 is an enlarged, fragmentary, perspective view of the apparatus of FIG. 1;

FIG. 4 is an enlarged, vertical sectional view taken along line 4—4 of FIG. 1.

Figure 5:
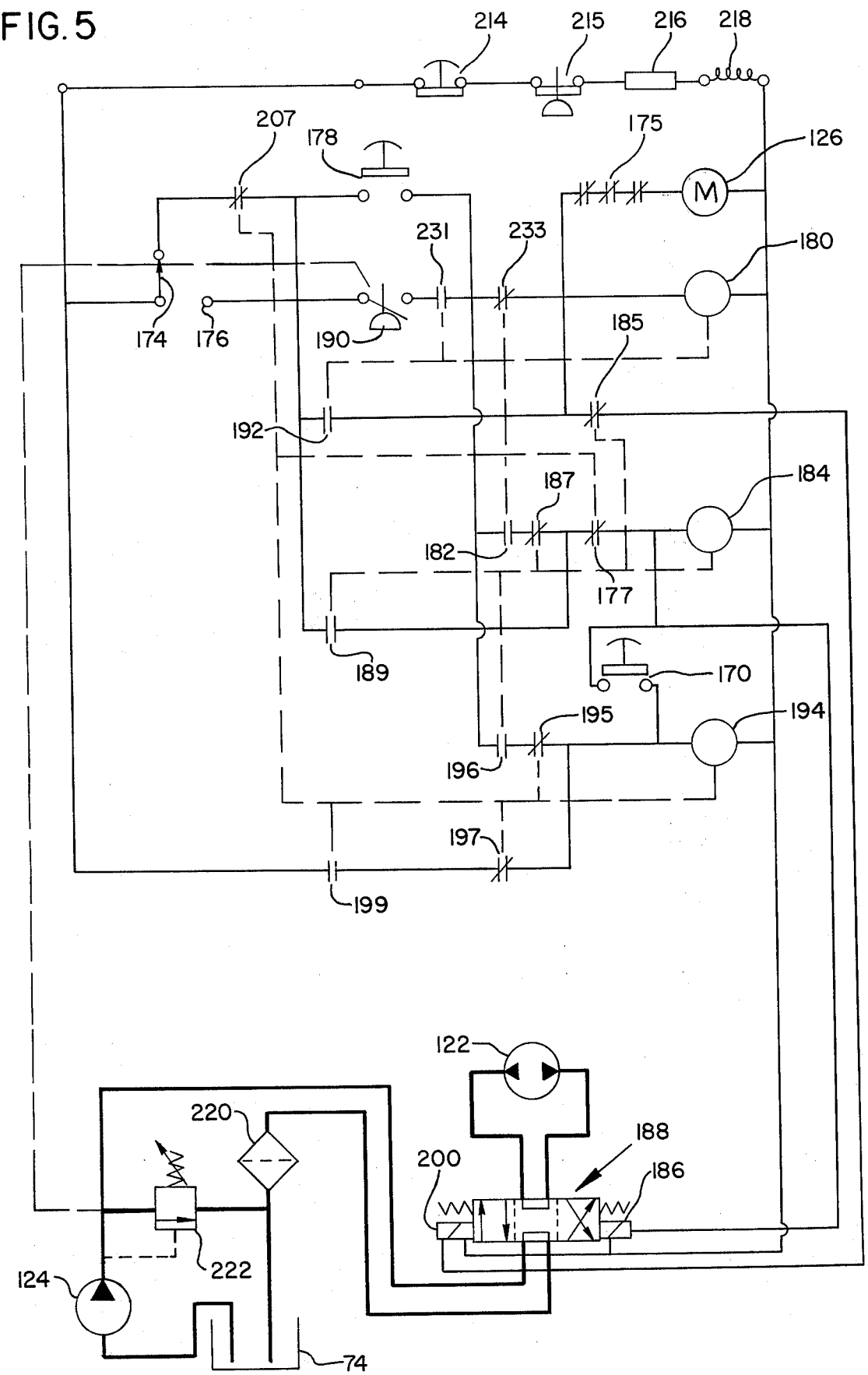
FIG. 5 is a schematic view of the electro-hydraulic control circuit of the apparatus of FIG. 1.

A wood cleaning and separating apparatus forming a specific embodiment of the invention includes a tank 10 containing water and an agitator unit 11 comprising an agitator 12 carried by a carriage 14 movable along rails 16 forming a track and agitating mixed demolition material or debris having floatable wood particles and sinkable pieces of concrete, metal etc. and pushing the floatable material to a floatable material conveyor 18 at one end of the tank. The separated sinkable material drops onto a cleated conveyor 20 having a course 22 moving along the bottom of the tank and moving the sinkable material up an inclined end portion 24 and out of the other end of the tank.

The tank 10 is supported by posts 30, and has vertical upper side portions 32 connected by sloping portions 34 to a channel-like bottom portion 36 supported by crossbeams 38 and in which the upper course 22 of the conveyor belt travels. The tracks are supported by beam-like supports 40 triangular in transverse cross-section. A motor 42 drives a drive roll 44 engaging the conveyor belt 20 through a gear reducer 46. Idler rolls 46, 48 and 50 guide the belt as do self-cleaning idler rolls 52 and 54, which hold the belt down in the bottom portion 36. A baffle 56 prevents excess heaps of the sinkable material from traveling out of the tank and side plates 58 laterally confine the material.

The carriage 14 (FIG. 3) includes rigid side members 60 and 62 having inwardly and upwardly sloping angle-like posts 64 integral with heavy plates 66, bar-like base members 68 and heavy, reinforcing crosspieces 70. Angular beams 72 are welded to the side members as is a heavy plate, angular reservoir 74, which is trapezoidal in transverse cross-section. A bracket 76 on the side member 60 mounts an electric motor drive 78 which rotates continuously the agitator 12 thrugh a belt 80 and a pulley 82 on stub shaft 84 of the agitator. The drive 78 may, of course, be hydraulic rather than electrical. The shaft 84 is journaled in bearing 86 mounted on the side member 60, and a second stub shaft 88 is journaled in bearing 90 carried by the side member 62. The shaft 88 extends through a removable cover 92 covering an access hole 94 that permits endwise insertion and removal of the agitator, a track 96 and ring 97 being provided for a hoist to lift the agitator into alignment with and insert it into its bearings 86 and 90. The agitator 12 comprises a drum 100 (FIG. 1) with narrow radial paddles 102 thereon forming a paddle wheel. If desired, the paddles may be omitted and a large number of short heavy pins arranged preferably in several parallel rows of double helices may be substituted therefor. The paddle wheel agitator normally is driven continuously in a clockwise direction, as viewed in FIG. 1, but may be stopped or reversed under the control of the operator.

Pairs of rollers 110 support the carriage on the rails 16 and move the carriage along the rails. The rollers 110 are driven by chains 112 driving sprockets 114 keyed to the rollers and driven by sprockets 116 keyed to drive shaft 118 journaled in bearings 120 mounted on the side members. The shaft 118 is driven by hydraulic motor 122 driven by a pump 124 driven by an electric motor drive 126. The pump 124 and motor 122 utilize hydraulic liquid 128 (FIG. 1) in the reservoir. The liquid 128 substantially fills the reservoir, which has a large volume, and acts as ballast to hold the carriage down. Mechanical stops 127 and 129 are provided to actuate a pressure switch on the carriage hydraulic drive system to reverse the direction of drive of the carriage.

The floatable material conveyor 18 (FIG. 1) includes a frame 130 pivotally mounted by a pin 132 and held in selected position of adjustment by hydraulic cylinder 134. A support plate 136 rigid with side plates 138 supports upper flight of conveyor belt 140 driven by a drive chain 142 driven by a sprocket on shaft 144 driven by a gear reducer 146 driven by a belt 148 and electric motor 150. The shaft 144 also drives a paddle wheel 152 through a chain-and-sprocket drive 154. The paddle wheel is carried by an arm 156 freely pivotal on the shaft 144. Lifting holes 160 are provided for removing the carriage. Also, the plate 66 and the cover 92 can have vertical slots to permit lifting the agitator after it has been released from its bearings. If desired, hydraulic cylinders can be provided for so lifting the agitator.

The electro-hydraulic control circuit (FIG. 5) includes a stop switch 214, a low oil switch 215, an overload fuse 216 and a winding of a control transformer 218 connected across a powerline. For manual operation, the motor starter 126 is energized through a contactor 174 set in manual position, relay contacts 207, manually operable momentary switch 178, overlap contacts 233 and overload thermals 175, simultaneously energizing also relay winding 180, its normally-open contacts 192 and solenoid winding 200 through normally-closed relay contacts 185 of relay winding 184. Also closed are normally-open contacts 231 and normally-open delayed contact 182 of winding 180. For automatic operation, the contactor 174 is manually set in engagement with contact 176. Switch 178 is closed, and the motor starter 26 is energized thrugh overlap contact 233. Solenoid winding 200 of four-way valve 188 is connected to the normally closed contacts 207 through relay contacts 185 and 192. Relay winding 184 is connected to switch 178 and contacts 231 through delayed contacts 182 and contacts 187 and 177, to a manual override switch 170 and to relay contacts 189 through the contacts 177. Solenoid winding 186 of the valve 188 is connected in parallel with the relay winding 184. Relay winding 194 is connected by contacts 195 and 196 to the switch 178 and the pressure switch 190, and also is connected through delayed relay contacts 197 to relay contacts 199. The hydraulic circuit includes a filter 220 and a relief valve 222.

OPERATION

The demolition material is dumped into the tank 10 between the carriage 14 and the conveyor 18. The electric motors 78 and 124 are started and run continuously. The motor 78 is set manually to drive the agitator 12 in a clockwise direction, as viewed in FIG. 1, and the hydraulic motor 122 is set by the operator to move the carriage to the left, as viewed in FIG. 1. The agitator 12 washes water onto the floating pile of debris to wash the wood components and move the wood components toward the exit conveyor 18. The sinkable components drop to the bottom of the tank and are conveyed out of the tank by the conveyor 20. The washed floating components are pushed to the conveyor 18 and are carried thereby out of the tank. The agitator not only washes water onto the floating pile of debris but also may engage and break up the pile. If the resistance to movement of the agitator into the pile becomes too great, the pressure switch 190 is actuated to reverse the motor 122 to back the agitator off to the right. Also, the operator can manually actuate the switches 170, 174 and 178. The adjustable stops 127 to 129 cause a reversal of the hydraulic drive motor by inducing resistance as the carriage arrives at each end of the track. The agitator 12 is rotated at a speed designed to create an optimum washing and urging of the material toward the floating material conveyor, a rotation of about 45 r.p.m. being one excellent speed.

For manual operation, start switch 178 closes energizing relay winding 180 causing contact 192 to close sealing in relay winding 180 and motor starter 126 through overload thermals 175. Contact 231 of relay winding 180 is now closed and contact 233 of relay winding 180 is an overlap contact which opens some microseconds after the relay winding 180 pulls in. Contact 182 of relay winding 180 is delayed on energization and closes some time, adjusted up to 60 seconds, after energization of relay winding 180. Solonoid 200 of the control valve is now energized causing the unit to travel down the tank. Upon encountering resistance to travel, pressure switch 190 is closed from the pressure buildup in the hydraulic circuit and current will flow to the relay winding 184 through contacts 187 and 177. The winding 184 seals in through simultaneus closure of contact 189 followed by opening of overlap contact 187 thus preventing feed back to relay winding 184 down to relay winding 194 after the delayed energization of contact 196 of relay winding 184. Contact 185 of relay winding 184 is opened to cancel the solenoid valve thus causing relay winding 186 to be energized and consequently the direction of travel of the unit to reverse. Delayed contact 196 of the relay of the winding 184 closes some time up to sixty seconds after energization of the relay winding 184. When the next pressure pulse from the pressure switch occurs after contact 196 has closed, relay winding 194 closes and is sealed in through its contact 199. This causes the contact 207 to open dropping out continuity to the sealing contacts of the motor starter 126 and windings 180 and 184. Thus, the motor stops pumping fluid and the control valve 188 is de-energized. Relay winding 194 is dropped out when its time delay contact 197 opens, adjusted up to sixty seconds after sealing in. Thus, the unit in manual mode will make one traverse between resistance points and stop.

In the automatic operation, selector switch 174 is turned to provide continuity through contact 176. When the start button is depressed, the unit will complete one cycle as before except that when the third pressure pulse occurs from the pressure switch, contact 177 of relay winding 194 opens dropping out winding 184 only, restoring control to winding 180 and causing the unit to reverse and change direction. This will continue until the next pressure pulse when winding 184 pulls in again and reverses direction of the unit. Whenever start switch 178 is depressed and the unit is running it will go to the next state as if it had received a pressure pulse. Additionally, when reverse button 170 is depressed, winding 194 is energized which will cause the unit to reverse or stop depending on which mode the selector switch 176 is set to.

If desired, a second agitator unit (not shown) identical to the unit 11 may be mounted on the tracks 16 with the material to be separated positioned between the two agitator units as well as between the conveyor 18 and the nearer agitator unit, both paddle wheel agitators being driven in the same direction to move the floatable material toward the conveyor 18. The added agitator unit has controls identical to those of the unit 11, and operates independently. Whenever the units travel toward each other to encounter sufficient resistance either from contact with each other or from the pile of floating material therebetween, the pressure swtiches 222 reverse their directions of movement. This also occurs when the units reach their respective ends of the tank or when encountering heavy resistance from the floating piles of material to be separated.

What is claimed is:
1. In a separator,
 a tank open at the top and containing liquid of a predetermined specific gravity,
 carriage means movable back and forth along said tank,
 agitator means carried by said carriage means, said agitator means being disposed to contact the upper portion of said liquid in said tank for breaking up and washing a floating pile of relatively heterogeneous floatable and sinkable components,
 reversible drive means for driving said carriage means,
 resistance responsive means for reversing said reversible drive means when said carriage means encounters a predetermined minimum resistance to movement along said tank, and
 conveyor means for removing the floatable components from said tank.

2. The separator of claim 1 including a pair of rails at the top of the tank forming a track,
 the carriage means including rollers supported by the rails and reversible drive means for rotating the rollers.

3. The separator of claim 2 including hydraulic drive means and a large hydraulic reservoir providing ballast.

4. The separator of claim 2 wherein the carriage includuds a pair of side frame members and overhead crossbeam means connecting the side frame members, the agitator means comprising a paddle wheel and means journaling the paddle wheel and mounted on the side frame members.

5. The separator of claim 4 including a drive shaft extending along the crossbeam means, and a pair of chain-and-sprocket drives carried by the side frame members and driven by the drive shaft and driving the rollers.

6. The separator of claim 5 wherein the agitator means comprises a paddle wheel and including a drive motor carried by the carriage and adapted to rotate the paddle wheel in a direction moving the upper portion of the liquid toward one end of the tank.

7. The separator of claim 1 wherein the carriage means includes a pair of side members each comprising a vertical side plate, a bottom beam member and a pair of angular, upwardly and inwardly sloping post members, the carriage means also including crossbeam means joining the upper portions of the side members.

8. The separator of claim 7 wherein the crossbeam means includes ballast tank means.

9. The separator of claim 1 wherein the agitator means includes a paddle wheel only partially immersed in the liquid and including means for rotating the paddle wheel in a direction causing a flow of the liquid toward one end of the tank, the conveyor means being located at said one end of the tank.

10. The separator of claim 9 including second conveyor means for removing sinkable components from the tank and discharging the sinkable components at the opposite end of the tank.

11. The separator of claim 10 wherein the second conveyor means include an endless member having an upper flight extending through and along the tank and a lower flight outside the tank and extending along and under the tank.

12. The separator of claim 9 including drive means for driving the carriage means toward said one end of the tank.

13. The separator of claim 12 wherein the drive means is reversible.

* * * * *